US008986635B2

(12) United States Patent
Blakeman et al.

(10) Patent No.: US 8,986,635 B2
(45) Date of Patent: Mar. 24, 2015

(54) EXHAUST SYSTEM FOR A LEAN-BURN IC ENGINE COMPRISING A PGM COMPONENT AND A SCR CATALYST

(71) Applicant: Johnson Matthey Public Limited Company, London (GB)

(72) Inventors: Philip Gerald Blakeman, Philadelphia, PA (US); Sougato Chatterjee, Wayne, PA (US); Andrew Francis Chiffey, Ware (GB); Jane Gast, Spring City, PA (US); Paul Richard Phillips, Royston (GB); Raj Rao Rajaram, Slough (GB); Andrew Peter Walker, Hazlemere (GB)

(73) Assignee: Johnson Matthey Public Limited Company, London (GB)

( * ) Notice: Subject to any disclaimer, the term of this patent is extended or adjusted under 35 U.S.C. 154(b) by 0 days.

(21) Appl. No.: 14/199,290

(22) Filed: Mar. 6, 2014

(65) Prior Publication Data

US 2014/0186245 A1 Jul. 3, 2014

Related U.S. Application Data

(63) Continuation of application No. 13/711,128, filed on Dec. 11, 2012, now Pat. No. 8,668,891.

(60) Provisional application No. 61/569,530, filed on Dec. 12, 2011.

(30) Foreign Application Priority Data

Jan. 18, 2012 (GB) .................................. 1200781.1

(51) Int. Cl.
| | | |
|---|---|---|
| *B01D 53/94* | (2006.01) | |
| *B01J 33/00* | (2006.01) | |
| *F01N 3/10* | (2006.01) | |
| *F01N 3/18* | (2006.01) | |
| *F01N 3/20* | (2006.01) | |
| *F01N 3/08* | (2006.01) | |
| *F01N 13/02* | (2010.01) | |
| *F01N 3/035* | (2006.01) | |

(52) U.S. Cl.
CPC ........ *B01D 53/9495* (2013.01); *B01D 53/9477* (2013.01); *B01D 53/9418* (2013.01); *B01D 53/944* (2013.01); *B01D 53/9481* (2013.01); *F01N 3/103* (2013.01); *F01N 3/2066* (2013.01); *B01D 2255/1021* (2013.01); *B01D 2255/1023* (2013.01); *B01D 2255/20715* (2013.01); *B01D 2255/2092* (2013.01); *B01D 2255/407* (2013.01); *B01D 2258/012* (2013.01); *Y02T 10/24* (2013.01); *F01N 3/035* (2013.01); *F01N 3/0842* (2013.01); *F01N 13/02* (2013.01); *F01N 2510/06* (2013.01); *F01N 3/0828* (2013.01); *Y10S 502/516* (2013.01); *Y10S 502/521* (2013.01)

USPC .................. 423/213.2; 423/213.5; 423/213.7; 60/274; 60/297; 60/299; 60/301; 502/516; 502/521

(58) Field of Classification Search
USPC ........... 423/213.2, 213.5, 213.7; 60/274, 297, 60/299, 301; 502/516, 521
See application file for complete search history.

(56) References Cited

U.S. PATENT DOCUMENTS

| | | | |
|---|---|---|---|
| 4,774,069 A | 9/1988 | Handley | |
| 5,473,887 A | 12/1995 | Takeshima et al. | |
| 6,080,375 A | 6/2000 | Mussmann et al. | |
| 6,093,378 A | 7/2000 | Deeba et al. | |
| 6,348,430 B1 | 2/2002 | Lindner et al. ................. | 502/304 |
| 6,835,689 B1 | 12/2004 | He et al. | |
| 7,550,124 B2 | 6/2009 | Chen et al. | |
| 7,758,834 B2 | 7/2010 | Chen et al. | |
| 8,252,258 B2 | 8/2012 | Müller-Stach et al. | |
| 8,303,919 B2 * | 11/2012 | Gadgil et al. ................. | 423/210 |
| 8,318,632 B2 | 11/2012 | Matsueda et al. | |
| 8,415,269 B2 | 4/2013 | Hao et al. ....................... | 502/325 |
| 8,822,364 B2 * | 9/2014 | Chen et al. ..................... | 502/56 |
| 2001/0053340 A1 | 12/2001 | Noda et al. | |
| 2004/0209769 A1 | 10/2004 | Demel et al. | |
| 2006/0057046 A1 | 3/2006 | Punke et al. | |
| 2006/0213323 A1 | 9/2006 | Yamada et al. | |

(Continued)

FOREIGN PATENT DOCUMENTS

| | | | |
|---|---|---|---|
| EP | 0341832 A2 | 11/1989 | |
| EP | 0622107 A2 | 11/1994 | |

(Continued)

OTHER PUBLICATIONS

Cavataio, G. et al., "Impact and Prevention of Ultra-Low Contamination of Platinum Group Metals on SCR Catalysts Due to DOC Design," 2009, SAE Technical Paper 2009-01-0627.

(Continued)

*Primary Examiner* — Timothy Vanoy
(74) *Attorney, Agent, or Firm* — Kevin M. Carroll

(57) ABSTRACT

Methods are disclosed for reducing or preventing a selective catalytic reduction (SCR) catalyst disposed on a first substrate monolith in an exhaust system of a lean-burn internal combustion engine from becoming poisoned with platinum group metal (PGM) which may volatilize from a catalyst composition comprising PGM disposed on at least one second substrate monolith upstream of the SCR catalyst. The methods comprise adsorbing volatilized PGM in at least one PGM trapping material, which is disposed on a third substrate monolith disposed between the first substrate monolith and the second substrate monolith.

20 Claims, 6 Drawing Sheets

(56) References Cited

U.S. PATENT DOCUMENTS

| | | |
|---|---|---|
| 2007/0157607 A1 | 7/2007 | Pfefferle |
| 2008/0045405 A1 | 2/2008 | Beutel et al. |
| 2008/0125308 A1 | 5/2008 | Fujdala et al. ............... 502/74 |
| 2009/0196812 A1 | 8/2009 | Bull et al. |
| 2009/0260349 A1 | 10/2009 | Gandhi et al. |
| 2009/0285737 A1 | 11/2009 | Bull et al. |
| 2010/0016150 A1 | 1/2010 | Yabuzaki et al. |
| 2010/0166629 A1 | 7/2010 | Deeba |
| 2010/0175372 A1 | 7/2010 | Lambert et al. |
| 2010/0180581 A1 | 7/2010 | Grubert et al. |
| 2010/0183490 A1 | 7/2010 | Hoke et al. |
| 2010/0215557 A1 | 8/2010 | Liu et al. |
| 2010/0221154 A1 | 9/2010 | Lee et al. |
| 2010/0263357 A1 | 10/2010 | Lindner et al. |
| 2010/0290964 A1 | 11/2010 | Southward et al. |
| 2011/0014099 A1 | 1/2011 | Dornhaus et al. |
| 2011/0064632 A1 | 3/2011 | Huang et al. |
| 2011/0064633 A1 | 3/2011 | Huang et al. |
| 2011/0099975 A1 | 5/2011 | Bailey et al. |
| 2011/0138777 A1 | 6/2011 | Jen et al. ............... 60/274 |
| 2011/0143921 A1 | 6/2011 | Hao et al. |
| 2011/0173950 A1 | 7/2011 | Wan et al. |
| 2011/0206584 A1 | 8/2011 | Dobson et al. |
| 2011/0286900 A1 | 11/2011 | Caudle et al. |
| 2012/0128558 A1 | 5/2012 | Nunan et al. |
| 2013/0084222 A1 | 4/2013 | Grubert et al. |
| 2013/0089481 A1 | 4/2013 | Sumiya et al. |
| 2013/0149207 A1 | 6/2013 | Castagnola et al. |
| 2013/0149221 A1 | 6/2013 | Blakeman et al. |
| 2013/0149223 A1 | 6/2013 | Blakeman et al. |

FOREIGN PATENT DOCUMENTS

| | | | |
|---|---|---|---|
| EP | 0766993 A2 | 4/1997 | |
| EP | 0830201 B1 | 1/2000 | |
| EP | 1925362 A1 | 5/2008 | |
| EP | 2275194 A1 | 1/2011 | |
| EP | 2520354 A1 | 11/2012 | |
| EP | 2535102 A1 | 12/2012 | |
| GB | 2375059 A1 | 11/2002 | |
| GB | 2406803 A | 4/2005 | |
| GB | 2495404 A | 4/2013 | |
| JP | 62068544 A | 3/1987 | |
| JP | 4022707 A | 1/1992 | |
| JP | 5-187230 A * | 7/1993 | ............... 60/299 |
| JP | 09271674 A | 10/1997 | |
| JP | 2006272064 A | 10/2006 | |
| JP | 2007229679 A | 9/2007 | |
| JP | 2008279352 A | 11/2008 | |
| WO | 9947260 A1 | 9/1999 | |
| WO | 0059630 A1 | 10/2000 | |
| WO | 2005016497 A1 | 2/2005 | |
| WO | 2008132452 A2 | 11/2008 | |
| WO | 2009093071 A1 | 7/2009 | |
| WO | 2009136206 A1 | 11/2009 | |
| WO | 2010075345 A2 | 7/2010 | |
| WO | 2010133309 A1 | 11/2010 | |
| WO | 2011080525 A1 | 7/2011 | |
| WO | 2011082357 A2 | 7/2011 | |
| WO | 2011092521 A1 | 8/2011 | |
| WO | 2011131324 A1 | 10/2011 | |
| WO | 2012133055 A1 | 10/2012 | |
| WO | 2012147376 A1 | 11/2012 | |
| WO | 2012156883 A1 | 11/2012 | |
| WO | 2012175948 A1 | 12/2012 | |

OTHER PUBLICATIONS

En, H-W. et al., "Detection, Origin and Effect of Ultra-Low Platinum Contamination on Diesel-SCR Catalysts," Powertrains, Fuels & Lubricants Meeting, Rosemont, Illinois, Oct. 6-9, 2008, SAE Technical Paper 2008-01-2488.

GB Search Report dated May 16, 2012 for corresponding GB Application No. GB1200781.1 filed Jan. 18, 2012.

International Search Report dated Mar. 25, 2013 for corresponding PCT International Patent Application No. PCT/GB2012/053089 filed Dec. 11, 2012.

* cited by examiner

EXHAUST SYSTEM FOR A LEAN-BURN IC ENGINE COMPRISING A PGM COMPONENT AND A SCR CATALYST

CROSS REFERENCE TO RELATED APPLICATIONS

This is a continuation of application Ser. No. 13/711,128, filed Dec. 11, 2012, issued as U.S. Pat. No. 8,668,891 on Mar. 11, 2014, which claims priority to U.S. Provisional Application No. 61/569,530, filed on Dec. 12, 2011 and United Kingdom Application No. 1200781.1, filed Jan. 18, 2012. The entire teachings of the above applications are incorporated herein by reference.

FIELD OF THE INVENTION

The present invention relates to an exhaust system for a vehicular lean-burn internal combustion engine, which system comprising a first substrate monolith comprising a SCR catalyst and at least one second substrate monolith comprising at least one platinum group metal (PGM) disposed upstream of the first substrate monolith.

BACKGROUND TO THE INVENTION

Generally, there are four classes of pollutant that are legislated against by inter-governmental organisations throughout the world: carbon monoxide (CO), unburned hydrocarbons (HC), oxides of nitrogen ($NO_x$) and particulate matter (PM).

As emissions standards for permissible emission of such pollutants in exhaust gases from vehicular engines become progressively tightened, a combination of engine management and multiple catalyst exhaust gas aftertreatment systems are being proposed and developed to meet these emission standards. For exhaust systems containing a particulate filter, it is common for engine management to be used periodically (e.g. every 500 km) to increase the temperature in the filter in order to combust substantially all remaining soot held on the filter thereby to return the system to a base-line level. These engine managed soot combustion events are often called "filter regeneration". While a primary focus of filter regeneration is to combust soot held on the filter, an unintended consequence is that one or more catalyst coatings present in the exhaust system, e.g. a filter coating on the filter itself (a so-called catalysed soot filter (CSF)) an oxidation catalyst (such as a diesel oxidation catalyst (DOC)) or a $NO_x$ adsorber catalyst (NAC) located upstream or downstream of the filter (e.g. a first DOC followed by a diesel particulate filter, followed in turn by a second DOC and finally a SCR catalyst) can be regularly exposed to high exhaust gas temperatures, depending on the level of engine management control in the system. Such conditions may also be experienced with unintended occasional engine upset modes or uncontrolled or poorly controlled regeneration events. However, some diesel engines, particularly heavy duty diesel engines operating at high load, may even expose catalysts to significant temperatures, e.g. >600° C. under normal operating conditions.

As vehicle manufacturers develop their engines and engine management systems for meeting the emission standards, the Applicant/Assignee is being asked by the vehicle manufacturers to propose catalytic components and combinations of catalytic components to assist in the goal of meeting the emission standards. Such components include DOCs for oxidising CO, HCs and optionally NO also; CSFs for oxidising CO, HCs, optionally for oxidising NO also, and for trapping particulate matter for subsequent combustion; NACs for oxidising CO and HC and for oxidising nitrogen monoxide (NO) and absorbing it from a lean exhaust gas and to desorb adsorbed $NO_x$ and for reducing it to $N_2$ in a rich exhaust gas (see below); and selective catalytic reduction (SCR) catalysts for reducing $NO_x$ to $N_2$ in the presence of a nitrogenous reductant, such as ammonia (see below).

In practice, catalyst compositions employed in DOCs and CSFs are quite similar. Generally, however, a principle difference between the use of a DOC and a CSF is the substrate monolith onto which the catalyst composition is coated: in the case of a DOC, the substrate monolith is typically a flow-through substrate monolith, comprising a metal or ceramic honeycomb monolith having an array of elongate channels extending therethrough, which channels are open at both ends; a CSF substrate monolith is a filtering monolith such as a wall-flow filter, e.g. a ceramic porous filter substrate comprising a plurality of inlet channels arranged in parallel with a plurality of outlet channels, wherein each inlet channel and each outlet channel is defined in part by a ceramic wall of porous structure, wherein each inlet channel is alternately separated from an outlet channel by a ceramic wall of porous structure and vice versa. In other words, the wall-flow filter is a honeycomb arrangement defining a plurality of first channels plugged at an upstream end and a plurality of second channels not plugged at the upstream end but plugged at a downstream end. Channels vertically and laterally adjacent to a first channel are plugged at a downstream end. When viewed from either end, the alternately plugged and open ends of the channels take on the appearance of a chessboard.

Quite complicated multiple layered catalyst arrangements such as DOCs and NACs can be coated on a flow-through substrate monolith. Although it is possible to coat a surface of a filter monolith, e.g. an inlet channel surface of a wall-flow filter, with more than one layer of catalyst composition, an issue with coating filtering monoliths is to avoid unnecessarily increasing back-pressure, when in use, by overloading the filter monolith with catalyst washcoat, thereby restricting the passage of gas therethrough. Hence, although coating a surface of a filter substrate monolith sequentially with one or more different catalyst layers is not impossible, it is more common for different catalyst compositions to be segregated either in zones, e.g. axially segregated front and rear half zones of a filter monolith, or else by coating an inlet channel of a wall-flow filter substrate monolith with a first catalyst composition and an outlet channel thereof with a second catalyst composition. However, in particular embodiments of the present invention, the filter inlet is coated with one or more layers, which layers may be the same or a different catalyst composition. It has also been proposed to coat a NAC composition on a filtering substrate monolith (see e.g. EP 0766993).

In exhaust systems comprising multiple catalyst components, each comprising a separate substrate monolith, typically, the SCR catalyst is located downstream of a DOC and/or a CSF and/or a NAC because it is known that by oxidising some nitrogen oxide (NO) in the exhaust gas to nitrogen dioxide ($NO_2$) so that there is about a 1:1 ratio of $NO:NO_2$ exiting the DOC and/or the CSF and/or the NAC, the downstream SCR reaction is promoted (see below). It is also well known from EP341832 (the so-called Continuously Regenerating Trap or CRT®) that $NO_2$, generated by oxidising NO in exhaust gas to $NO_2$, can be used to combust soot passively on a downstream filter. In exhaust system arrangements where the process of EP341832 is important, were the SCR catalyst to be located upstream of the filter, this would reduce or prevent the process of combusting trapped soot in $NO_2$, because a majority of the $NO_x$ used for combusting the soot would likely be removed on the SCR catalyst.

However, a preferred system arrangement for light-duty diesel vehicles is a diesel oxidation catalyst (DOC) followed by a nitrogenous reductant injector, then a SCR catalyst and finally a catalysed soot filter (CSF). A short hand for such an arrangement is "DOC/SCR/CSF". This arrangement is preferred for light-duty diesel vehicles because an important consideration is to achieve $NO_x$ conversion in an exhaust system as quickly as is possible after a vehicle engine is started to enable (i) precursors of nitrogenous reductants such as ammonia to be injected/decomposed in order to liberate ammonia for $NO_x$ conversion; and (ii) as high $NO_x$ conversion as possible. Were a large thermal mass filter to be placed upstream of the SCR catalyst, i.e. between the DOC and the SCR catalyst ("DOC/CSF/SCR"), (i) and (ii) would take far longer to achieve and $NO_x$ conversion as a whole of the emission standard drive cycle could be reduced. Particulate removal can be done using oxygen and occasional forced regeneration of the filter using engine management techniques.

It has also been proposed to coat a SCR catalyst washcoat on a filter substrate monolith itself (see e.g. WO 2005/016497), in which case an oxidation catalyst may be located upstream of the SCR-coated filter substrate (whether the oxidation catalyst is a component of a DOC, a CSF or a NAC) in order to modify the $NO/NO_2$ ratio for promoting $NO_x$ reduction activity on the SCR catalyst. There have also been proposals to locate a NAC upstream of a SCR catalyst disposed on a flow-through substrate monolith, which NAC can generate $NH_3$ in situ during regeneration of the NAC (see below). One such proposal is disclosed in GB 2375059.

NACs are known e.g. from U.S. Pat. No. 5,473,887 and are designed to adsorb $NO_x$ from lean exhaust gas (lambda>1) and to desorb the $NO_x$ when the oxygen concentration in the exhaust gas is decreased. Desorbed $NO_x$ may be reduced to $N_2$ with a suitable reductant, e.g. engine fuel, promoted by a catalyst component, such as rhodium, of the NAC itself or located downstream of the NAC. In practice, control of oxygen concentration can be adjusted to a desired redox composition intermittently in response to a calculated remaining $NO_x$ adsorption capacity of the NAC, e.g. richer than normal engine running operation (but still lean of stoichiometric or lambda=1 composition), stoichiometric or rich of stoichiometric (lambda<1). The oxygen concentration can be adjusted by a number of means, e.g. throttling, injection of additional hydrocarbon fuel into an engine cylinder such as during the exhaust stroke or injecting hydrocarbon fuel directly into exhaust gas downstream of an engine manifold.

A typical NAC formulation includes a catalytic oxidation component, such as platinum, a significant quantity, (i.e. substantially more than is required for use as a promoter such as a promoter in a three-way catalyst), of a $NO_x$-storage component, such as barium, and a reduction catalyst, e.g. rhodium. One mechanism commonly given for $NO_x$-storage from a lean exhaust gas for this formulation is:

  (1); and

  (2).

wherein in reaction (1), the nitric oxide reacts with oxygen on active oxidation sites on the platinum to form $NO_2$. Reaction (2) involves adsorption of the $NO_2$ by the storage material in the form of an inorganic nitrate.

At lower oxygen concentrations and/or at elevated temperatures, the nitrate species become thermodynamically unstable and decompose, producing NO or $NO_2$ according to reaction (3) below. In the presence of a suitable reductant, these nitrogen oxides are subsequently reduced by carbon monoxide, hydrogen and hydrocarbons to $N_2$, which can take place over the reduction catalyst (see reaction (4)).

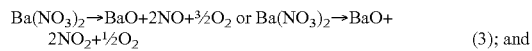  (3); and

  (4);

(Other reactions include $Ba(NO_3)_2+8H_2\rightarrow BaO+2NH_3+5H_2O$ followed by $NH_3+NO_x\rightarrow N_2+yH_2O$ or $2NH_3+2O_2+CO\rightarrow N_2+3H_2O+CO_2$ etc.).

In the reactions of (1)-(4) inclusive herein above, the reactive barium species is given as the oxide. However, it is understood that in the presence of air most of the barium is in the form of the carbonate or possibly the hydroxide. The skilled person can adapt the above reaction schemes accordingly for species of barium other than the oxide and sequence of catalytic coatings in the exhaust stream.

Oxidation catalysts promote the oxidation of CO to $CO_2$ and unburned HCs to $CO_2$ and $H_2O$. Typical oxidation catalysts include platinum and/or palladium on a high surface area support.

The application of SCR technology to treat $NO_x$ emissions from vehicular internal combustion (IC) engines, particularly lean-burn IC engines, is well known. Examples of nitrogenous reductants that may be used in the SCR reaction include compounds such as nitrogen hydrides, e.g. ammonia ($NH_3$) or hydrazine, or an $NH_3$ precursor.

$NH_3$ precursors are one or more compounds from which $NH_3$ can be derived, e.g. by hydrolysis. Decomposition of the precursor to ammonia and other by-products can be by hydrothermal or catalytic hydrolysis. $NH_3$ precursors include urea ($CO(NH_2)_2$) as an aqueous solution or as a solid or ammonium carbamate ($NH_2COONH_4$). If the urea is used as an aqueous solution, a eutectic mixture, e.g. a 32.5% $NH_3$ (aq), is preferred. Additives can be included in the aqueous solutions to reduce the crystallisation temperature. Presently, urea is the preferred source of $NH_3$ for mobile applications because it is less toxic than $NH_3$, it is easy to transport and handle, is inexpensive and commonly available. Incomplete hydrolysis of urea can lead to increased PM emissions on tests for meeting the relevant emission test cycle because partially hydrolysed urea solids or droplets will be trapped by the filter paper used in the legislative test for PM and counted as PM mass. Furthermore, the release of certain products of incomplete urea hydrolysis, such as cyanuric acid, is environmentally undesirable.

SCR has three main reactions (represented below in reactions (5)-(7) inclusive) which reduce $NO_x$ to elemental nitrogen.

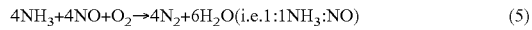  (5)

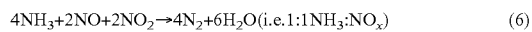  (6)

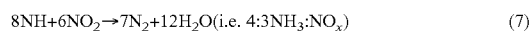  (7)

A relevant undesirable, non-selective side-reaction is:

  (8)

In practice, reaction (7) is relatively slow compared with reaction (5) and reaction (6) is quickest of all. For this reason, when skilled technologists design exhaust aftertreatment systems for vehicles, they often prefer to dispose an oxidation catalyst element (e.g. a DOC and/or a CSF and/or a NAC) upstream of an SCR catalyst.

when certain DOCs and/or NACs and/or CSFs become exposed to the high temperatures encountered during filter regeneration and/or an engine upset event and/or (in certain heavy-duty diesel applications) normal high temperature exhaust gas, it is possible given sufficient time at high temperature for low levels of platinum group metal components, particularly Pt, to volatilise from the DOC and/or the NAC and/or the CSF components and subsequently for the platinum group metal to become trapped on a downstream SCR catalyst. This can have a highly detrimental effect on the performance of the SCR catalyst, since the presence of Pt leads to a high activity for competing, non-selective ammonia oxidation such as in reaction (9) (which shows the complete oxidation of $NH_3$), thereby producing secondary emissions and/or unproductively consuming $NH_3$.

$$4NH_3 + 5O_2 \rightarrow 4NO + 6H_2O \qquad (9)$$

One vehicle manufacturer has reported the observation of this phenomenon in SAE paper 2009-01-0627, which is entitled "Impact and Prevention of Ultra-Low Contamination of Platinum Group Metals on SCR catalysts Due to DOC Design" and includes data comparing the $NO_x$ conversion activity against temperature for a Fe/zeolite SCR catalyst located in series behind four suppliers' platinum group metal (PGM)-containing DOCs that were contacted with a flowing model exhaust gas at 850° C. for 16 hours. The results presented show that the $NO_x$ conversion activity of a Fe/zeolite SCR catalyst disposed behind a 20Pt:Pd DOC at 70 gft$^{-3}$ total PGM was negatively altered at higher evaluation temperatures as compared to lower evaluation temperatures as a result of Pt contamination. Two 2Pt:Pd DOCs from different suppliers at 105 gft$^{-3}$ total PGM were also tested. In a first 2Pt:Pd DOC, the SCR catalyst activity was affected to a similar extent as the test on the 20Pt:Pd DOC, whereas for the second 2Pt:Pd DOC tested the SCR catalyst activity was contaminated to a lesser extent, although the second 2Pt:Pd DOC still showed reduced $NO_x$ conversion activity compared with the blank control (no DOC, just a bare substrate). The authors concluded that the supplier of the second 2Pt:Pd DOC, which showed more moderate $NO_x$ conversion degradation, was more successful in stabilising the 70 gft$^{-3}$ Pt present with the 35 gft$^{-3}$ Pd. A Pd-only DOC at 150 gft$^{-3}$ demonstrated no impact on the downstream SCR relative to the blank control. Earlier work from the authors of SAE 2009-01-0627 was published in SAE paper no. 2008-01-2488.

SUMMARY OF THE INVENTION

Vehicle manufacturers have begun asking the Applicant for measures to solve the problem of volatilisation of relatively low levels PGMs from components upstream of SCR catalysts. It would be highly desirable to develop strategies to prevent this PGM movement onto a downstream SCR catalyst at high temperatures. The present inventors have developed a number of strategies for meeting this need.

The inventors have found that volatilisation of platinum from a PGM-containing catalyst comprising both platinum and palladium can occur under extreme temperature conditions when the weight ratio of Pt:Pd is greater than about 2:1. It is also believed that where the PGM consists of platinum, platinum volatilisation may also be observed. The present inventors have devised an exhaust system arrangement for use in combination with a downstream SCR catalyst which avoids or reduces the problem of PGM, particularly Pt, migrating from an upstream relatively highly loaded Pt catalyst to a downstream SCR catalyst.

According to a first aspect, the invention provides an exhaust system for a vehicular lean-burn internal combustion engine, which system comprising:
(a) a first substrate monolith comprising a SCR catalyst;
(b) at least one second substrate monolith comprising a catalytic washcoat coating comprising at least one platinum group metal (PGM), which at least one second substrate monolith is disposed upstream of the first substrate monolith; and
(c) a third substrate monolith disposed between the first substrate monolith and the or each second substrate monolith, wherein at least one PGM on the or each second substrate monolith is liable to volatilise when the or each second substrate monolith is exposed to relatively extreme conditions including relatively high temperatures, and wherein the third substrate monolith comprises a washcoat coating comprising at least one material for trapping volatilised PGM. In general, it is preferred that the at least one material for trapping volatilised PGM is a metal oxide.

According to a further aspect, there is provided a lean-burn internal combustion engine, preferably a compression ignition engine, comprising an exhaust system according to the invention.

According to a further aspect, there is provided a vehicle comprising an engine according to the invention.

According to a further aspect, the invention provides method of reducing or preventing a selective catalytic reduction (SCR) catalyst disposed on a first substrate monolith in an exhaust system of a lean-burn internal combustion engine from becoming poisoned with platinum group metal (PGM) which may volatilise from a catalyst composition comprising PGM disposed on at least one second substrate monolith upstream of the SCR catalyst when the catalyst composition comprising PGM is exposed to relatively extreme conditions including relatively high temperatures, which method comprising adsorbing volatilised PGM in at least one PGM trapping material, which is disposed on a third substrate monolith.

A further aspect of the invention relates to the use of a substrate monolith (e.g. a third substrate monolith) to reduce or prevent poisoning of a selective catalytic reduction (SCR) catalyst by a platinum group metal (PGM), typically in an exhaust system of a lean-burn internal combustion engine, wherein the substrate monolith comprises at least one material for trapping volatilised PGM, and wherein the substrate monolith is disposed between a first substrate monolith and at least one second substrate monolith, wherein the first substrate monolith comprises a SCR catalyst, and the at least one second substrate monolith comprises a catalytic washcoat coating comprising at least one platinum group metal (PGM). Typically, the at least one second substrate monolith is disposed upstream of the first substrate monolith.

BRIEF DESCRIPTION OF THE DRAWINGS

In order that the invention may be more fully understood, reference is made to the following Examples by way of illustration only and with reference to the accompanying drawings.

DETAILED DESCRIPTION OF THE INVENTION

Figure 1:
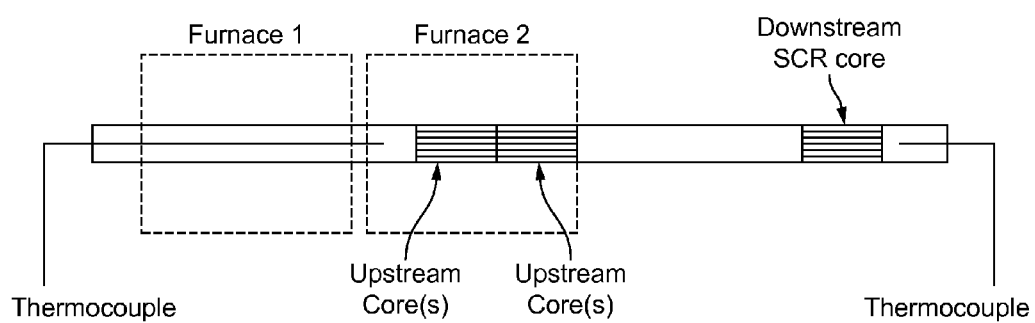
FIG. 1 is a schematic drawing of a laboratory reactor used for testing platinum contamination on an Fe/Beta zeolite or a Cu/CHA SCR catalyst.

In general, the catalytic washcoat coating comprising at least one PGM comprises one or more support materials for the PGM. The catalyst is typically applied to the or each second substrate monolith as a washcoat slurry comprising at least one PGM salt and one or more support material for supporting the at least one PGM in the finished catalyst coating, before the or each coated substrate monolith is dried and then calcined. The one or more material for supporting the at least one PGM may be referred to as a "washcoat component". It is also possible for at least one PGM to be pre-fixed to one or more support material prior to it being slurried in an aqueous medium prior to coating, or for a combination of support material particles pre-fixed with PGM to be slurried in a solution of PGM salt.

The catalytic washcoat coating may comprise a plurality of washcoat coatings. For example, the catalyst washcoat coating may comprise a first washcoat coating and a second washcoat coating. When there is a plurality of washcoat coatings, then at least one of the washcoat coatings comprises at least one PGM.

By at least one "support material" herein, we mean a metal oxide selected from the group consisting of optionally stabilised alumina, amorphous silica-alumina, optionally stabilised zirconia, ceria, titania, an optionally stabilised ceria-zirconia mixed oxide and a molecular sieve or mixtures of any two or more thereof.

The at least one support material may include one or more molecular sieve, e.g. an aluminosilicate zeolite. The primary duty of the molecular sieve in the PGM catalyst for use in the present invention is for improving hydrocarbon conversion over a duty cycle by storing hydrocarbon following cold start or during cold phases of a duty cycle and releasing stored hydrocarbon at higher temperatures when associated platinum group metal catalyst components are more active for HC conversion. See for example Applicant/Assignee's EP 0830201. Molecular sieves are typically used in catalyst compositions according to the invention for light-duty diesel vehicles, whereas they are rarely used in catalyst compositions for heavy duty diesel applications because the exhaust gas temperatures in heavy duty diesel engines mean that hydrocarbon trapping functionality is generally not required.

However, molecular sieves such as aluminosilicate zeolites are not particularly good supports for platinum group metals because they are mainly silica, particularly relatively higher silica-to-alumina molecular sieves, which are favoured for their increased thermal durability: they may thermally degrade during ageing so that a structure of the molecular sieve may collapse and/or the PGM may sinter, giving lower dispersion and consequently lower HC and/or CO conversion activity.

Accordingly, it is preferred that the catalytic washcoat coating comprises a molecular sieve at ≤30% by weight (such as ≤25% by weight, ≤20% by weight e.g. ≤15% by weight) of the individual washcoat coating layer. When the catalytic washcoat coating comprises a first washcoat coating and a second washcoat coating, then the first washcoat coating and/or the second washcoating coating preferably coating comprise a molecular sieve at ≤30% by weight (such as ≤25% by weight, ≤20% by weight e.g. ≤15% by weight) of each individual washcoat coating layer.

Typically, the catalytic washcoat coating comprises a support material (e.g. a support material for the PGM). The support material may comprise or consist of a metal oxide selected from the group consisting of optionally stabilised alumina, amorphous silica-alumina, optionally stabilised zirconia, ceria, titania and an optionally stabilised ceria-zirconia mixed oxide or mixtures of any two or more thereof. Suitable stabilisers include one or more of silica and rare earth metals.

When there is a first washcoat coating and a second washcoat coating, then the first washcoat coating and/or the second washcoat coating may comprise at least one support material. Typically, the support material comprises a metal oxide selected from the group consisting of optionally stabilised alumina, amorphous silica-alumina, optionally stabilised zirconia, ceria, titania and an optionally stabilised ceria-zirconia mixed oxide or mixtures of any two or more thereof. Suitable stabilisers include one or more of silica and rare earth metals.

Preferred molecular sieves for use as support materials/hydrocarbon absorbers are medium pore zeolites, preferably aluminosilicate zeolites, i.e. those having a maximum ring size of eight tetrahedral atoms, and large pore zeolites (maximum of ten tetrahedral atoms) preferably aluminosilicate zeolites, include natural or synthetic zeolites such as faujasite, clinoptilolite, mordenite, silicalite, ferrierite, zeolite X, zeolite Y, ultrastable zeolite Y, ZSM-5 zeolite, ZSM-12 zeolite, SSZ-3 zeolite, SAPO-5 zeolite, offretite or a beta zeolite, preferably ZSM-5, beta and Y zeolites. Preferred zeolite adsorbent materials have a high silica to alumina ratio, for improved hydrothermal stability. The zeolite may have a silica/alumina molar ratio of from at least about 25/1, preferably at least about 50/1, with useful ranges of from about 25/1 to 1000/1, 50/1 to 500/1 as well as about 25/1 to 100/1, 25/1 to 300/1, from about 100/1 to 250/1.

Typically, the at least one material for trapping volatilised PGM of the third substrate monolith comprises a metal oxide selected from the group consisting of optionally stabilised alumina, optionally stabilised zirconia, an optionally stabilised ceria-zirconia mixed oxide and mixtures of any two or more thereof. Suitable stabilisers include one or more of silica and rare earth metals. It is preferred that the metal oxide is selected from the group consisting of optionally stabilised alumina and optionally stabilised ceria-zirconia mixed oxide.

The inventors have found that particularly alumina and ceria-containing metal oxides per se are capable of trapping volatilised PGMs, particularly ceria, which has a particular affinity for Pt.

In one embodiment, the third substrate monolith does not comprise, or the at least one material for trapping volatilised PGM is not, cerium oxide or a perovskite material, such as CaTiO.

The at least one material for trapping volatilised PGM of the third substrate monolith may be a component of an extruded substrate monolith. However, it is preferred that the at least one material for trapping volatilised PGM of the third substrate monolith is applied as a component of a washcoat coating to an inert substrate monolith.

Typically, the third substrate monolith comprises a total amount of the material for trapping volatilised PGM of 0.1 to 5 g in$^{-3}$, preferably 0.2 to 4 g in$^{-3}$ (e.g. 0.5 to 3.5 g in$^{-3}$), such as 1 to 2.5 g in$^{-3}$.

In general, at least one second substrate monolith preferably comprises platinum (e.g. the at least one platinum group metal (PGM) of the catalytic washcoat coating comprises platinum). When at least one PGM in a second substrate monolith is platinum, then the platinum is a PGM liable to volatilise when the second substrate monolith is exposed to relatively extreme conditions including relatively high temperatures. The relatively extreme conditions including relatively high temperatures are, for example, temperatures of ≥700° C., preferably ≥800° C., or more preferably ≥900° C.

Typically, at least one second substrate monolith comprises both platinum and palladium (e.g. the at least one platinum group metal (PGM) of the catalytic washcoat coating is both platinum and palladium). The platinum and/or the palladium can be the PGM liable to volatilise when the second substrate monolith is exposed to relatively extreme conditions including relatively high temperatures. However, when both platinum and palladium are present, then normally platinum is more likely to be the PGM liable to volatilise when the first washcoat coating is exposed to relatively extreme conditions including relatively high temperatures.

In the second substrate monolith, it is possible for relatively high Pt:Pd weight ratios to be used in the catalytic washcoat coating, such as the first washcoat coating, for the purposes of, e.g. generating $NO_2$ to promote downstream combustion of filtered particulate matter.

Preferably, the weight ratio of Pt:Pd is ≤10:1, e.g. 8:1, 6:1, 5:1 or 4:1. Such relatively high weight ratios are permissible because any volatilised PGM is trapped on the third substrate monolith.

It is preferred that in the second substrate monolith the weight ratio of Pt:Pd is ≤2, such as ≤1.5:1, e.g. about 1:1. The inventors have found that it is possible to further reduce or prevent migration of PGM from the at least one second substrate monolith to a downstream SCR catalyst by adopting such Pt:Pd weight ratios for the second substrate monolith. These ratios have been found to further reduce PGM volatilisation. The significance of this feature is shown in the Examples: the inventors have found that the preferred Pt:Pd weight ratios volatilise less, by empiric testing, than a similar catalyst having a Pt:Pd weight ratio of 4:1. In layered catalyst arrangements (e.g. when the catalytic washcoat coating comprises a plurality of washcoat coatings, such as a first washcoat coating and a second washcoat coating), it is preferred that an outer layer has a Pt:Pd weight ratio of ≤2, or optionally that the overall Pt:Pd weight ratio of all layers combined is ≤2.

Typically, the weight ratio of Pt:Pd is ≥35:65 (e.g. ≥7:13). It is preferred that the weight ratio Pt:Pd is ≥40:60 (e.g. ≥2:3), more preferably ≥42.5:57.5 (e.g. ≥17:23), particularly ≥45:55 (e.g. ≥9:11), such as ≥50:50 (e.g. ≥1:1), and still more preferably ≥1.25:1. The weight ratio of Pt:Pd is typically 10:1 to 7:13. It is preferred that the weight ratio of Pt:Pd is 8:1 to 2:3, more preferably 6:1 to 17:23, even more preferably 5:1 to 9:11, such as 4:1 to 1:1, and still more preferably 2:1 to 1.25:1.

Generally, the total amount of the platinum group metal (PGM) (e.g. the total amount of Pt and/or Pd) is 1 to 500 g ft$^{-3}$. Preferably, the total amount of the PGM is 5 to 400 g ft$^{-3}$, more preferably 10 to 300 g ft$^{-3}$, still more preferably, 25 to 250 g ft$^{-3}$, and even more preferably 35 to 200 g ft$^{-3}$.

The at least one material for trapping volatilised PGM of the third substrate monolith may comprise a catalyst composition comprising at least one metal selected from the group consisting of palladium, copper, silver, gold and combinations of two or more thereof, supported on at least one support material. The washcoat of the third substrate monolith can comprise, with advantage, a washcoat coating comprising both platinum and palladium at a lower Pt:Pd weight ratio than the or each washcoat of the or each second substrate monolith, preferably at a Pt:Pd molar ratio of ≤2, such as ≤1.5, e.g. about 1:1, or an alloy of Pd—Au.

The exhaust system according to the invention may further comprise an injector for injecting a nitrogenous reductant (e.g. ammonia, or a precursor thereof, such as urea) into a flowing exhaust gas between the first substrate monolith and the second substrate monolith. Alternatively, (i.e. without means for injecting ammonia or a precursor thereof such as urea is disposed between the first catalysed substrate monolith and the second catalysed substrate monolith), or in addition to the means for injecting a nitrogenous reductant (e.g. ammonia or a precursor thereof, such as urea), engine management means may be provided for enriching exhaust gas, such that ammonia gas is generated in situ by reduction of $NO_x$ on the PGM catalyst of the or each second substrate monolith.

Nitrogenous reductants and precursors thereof for use in the present invention include any of those mentioned hereinabove in connection with the background section. Thus, for example, the nitrogenous reductant is preferably ammonia or urea.

In combination with an appropriately designed and managed diesel compression ignition engine, enriched exhaust gas, i.e. exhaust gas containing increased quantities of carbon monoxide and hydrocarbon relative to normal lean running mode, contacts the NAC. Components within a NAC such as PGM-promoted ceria or ceria-zirconia can promote the water-gas shift reaction, i.e. $CO_{(g)}+H_2O_{(v)} \rightarrow CO_{2(g)}+H_{2(g)}$ evolving $H_2$. From the side reaction footnote to reactions (3) and (4) set out hereinabove, e.g. $Ba(NO_3)_2+8H_2 \rightarrow BaO+2NH_3+5H_2O$, $NH_3$ can be generated in situ and stored for $NO_x$ reduction on the downstream SCR catalyst.

Typically, the means for injecting is arranged to inject nitrogenous reductant or a precursor thereof into a flowing exhaust gas between the or each second substrate monolith and the third substrate monolith. In this arrangement, the third substrate monolith may include a SCR catalyst comprising copper. This has the advantages that the third substrate monolith can act as a SCR catalyst, a hydrolysis catalyst, i.e. to hydrolyse a nitrogenous reductant precursor, e.g. urea to ammonia and water, and a PGM trap, and can also assist with mixing and distribution of the nitrogenous reductant in a flowing exhaust gas.

Alternatively, the means for injecting can be arranged to inject nitrogenous reductant or a precursor thereof into a flowing exhaust gas between the third substrate monolith and the first substrate monolith.

The or each at least one second substrate monolith may be individually selected from an oxidation catalyst or a $NO_x$ Absorber Catalyst (NAC). Generally, a NAC contains significant quantities of alkaline earth metals and/or alkali metals relative to an oxidation catalyst. The NAC typically also includes ceria or a ceria-containing mixed oxide, e.g. a mixed oxide of cerium and zirconium, which mixed oxide optionally further including one or more additional lanthanide or rare earth elements. The oxidation catalyst generally has a composition as described in the background set out hereinabove.

The or each first, second and/or third substrate monolith for use in the invention can be a flow-through substrate monolith or a filtering substrate monolith having inlet surfaces and outlet surfaces, wherein the inlet surfaces are separated from the outlet surfaces by a porous structure. It is preferred that the filtering substrate monolith in each case is a wall-flow filter, i.e. a ceramic porous filter substrate comprising a plurality of inlet channels arranged in parallel with a plurality of outlet channels, wherein each inlet channel and each outlet channel is defined in part by a ceramic wall of porous structure, wherein each inlet channel is alternatingly separated from an outlet channel by a ceramic wall of porous structure and vice versa. In other words, the wall-flow filter is a honeycomb arrangement defining a plurality of first channels plugged at an upstream end and a plurality of second channels not plugged at the upstream end but plugged at a downstream end. Channels vertically and laterally adjacent to a first channel are plugged at a downstream end. When viewed from either end, the alternately plugged and open ends of the channels take on the appearance of a chessboard.

Catalysed filters, preferably wall-flow filters, can be coated using the method disclosed in Applicant/Assignee's WO 2011/080525. That is, a method of coating a honeycomb monolith substrate comprising a plurality of channels with a liquid comprising a catalyst component, which method comprising the steps of: (i) holding a honeycomb monolith substrate substantially vertically; (ii) introducing a pre-determined volume of the liquid into the substrate via open ends of the channels at a lower end of the substrate; (iii) sealingly retaining the introduced liquid within the substrate: (iv) inverting the substrate containing the retained liquid; and (v) applying a vacuum to open ends of the channels of the substrate at the inverted, lower end of the substrate to draw the liquid along the channels of the substrate. The catalyst composition may be coated on filter channels from a first end, following which the coated filter can be dried.

Use of such a method can be controlled using e.g. vacuum strength, vacuum duration, washcoat viscosity, washcoat solids, coating particle or agglomerate size and surface tension so that catalyst is coated predominantly on the inlet surfaces but also optionally within the porous structure but near to the inlet surfaces. Alternatively, the washcoat components may be milled to a size e.g. D90<5 μm, so that they "permeate" the porous structure of the filter (see WO 2005/016497).

The first substrate monolith comprises a catalyst for selectively catalysing the reduction of oxides of nitrogen to dinitrogen with a nitrogenous reductant, also known as a selective catalytic reduction (SCR) catalyst.

The SCR catalyst may be coated as a coating onto a substrate monolith, such as described hereinabove. Alternatively, the SCR catalyst is provided as an extrudate (also known as a "catalyst body"), i.e. the catalyst is mixed with components of the substrate monolith structure, which are both extruded, so the catalyst is part of the walls of the substrate monolith.

The SCR catalyst of the first substrate monolith can comprise a filtering substrate monolith, preferably a wall-flow filter, or a flow-through substrate monolith. It is also possible to make a wall-flow filter from an extruded SCR catalyst (see Applicant/Assignee's WO 2009/093071 and WO 2011/092521).

SCR catalysts can be selected from the group consisting of at least one of Cu, Hf, La, Au, In, V, lanthanides and Group VIII transition metals, such as Fe, supported on a refractory oxide or molecular sieve. Suitable refractory oxides include $Al_2O_3$, $TiO_2$, $CeO_2$, $SiO_2$, $ZrO_2$ and mixed oxides containing two or more thereof. Non-zeolite catalyst can also include tungsten oxide, e.g. $V_2O_5/WO_3/TiO_2$. Preferred metals of particular interest are selected from the group consisting of Ce, Fe and Cu. Molecular sieves can be ion-exchanged with the above metals.

It is preferred that the at least one molecular sieve, is an aluminosilicate zeolite or a SAPO. The at least one molecular sieve can be a small, a medium or a large pore molecular sieve, for example. By "small pore molecular sieve" herein we mean a molecular sieves containing a maximum ring size of 8 tetrahedral atoms, such as CHA; by "medium pore molecular sieve" herein we mean a molecular sieve containing a maximum ring size of 10 tetrahedral atoms, such as ZSM-5; and by "large pore molecular sieve" herein we mean a molecular sieve having a maximum ring size of 12 tetrahedral atoms, such as beta. Small pore molecular sieves are potentially advantageous for use in SCR catalysts—see for example Applicant/Assignee's WO 2008/132452. Molecular sieves for use in SCR catalysts according to the invention include one or more metals incorporated into a framework of the molecular sieve, e.g. Fe "in-framework" Beta and Cu "in-framework" CHA.

Particular molecular sieves with application in the present invention are selected from the group consisting of AEI, ZSM-5, ZSM-20, ERI including ZSM-34, mordenite, ferrierite, BEA including Beta, Y, CHA, LEV including Nu-3, MCM-22 and EU-1, with CHA molecular sieves currently preferred in combination with Cu as a promoter. e.g. ion-exchanged.

The invention also provides a lean-burn internal combustion engine. The lean-burn internal combustion engine can be a positive ignition, e.g. a spark ignition, engine that typically run on gasoline fuel or blends of gasoline fuel and other components such as ethanol, but is preferably a compression ignition, e.g. a diesel-type engine. Lean-burn internal combustion engines include homogenous charge compression ignition (HCCI) engines, powered either by gasoline etc. fuel or diesel fuel.

The engine may comprise engine management means arranged, when in use, to contact the filter with an enriched exhaust gas for generating ammonia in situ.

Figure 6A:
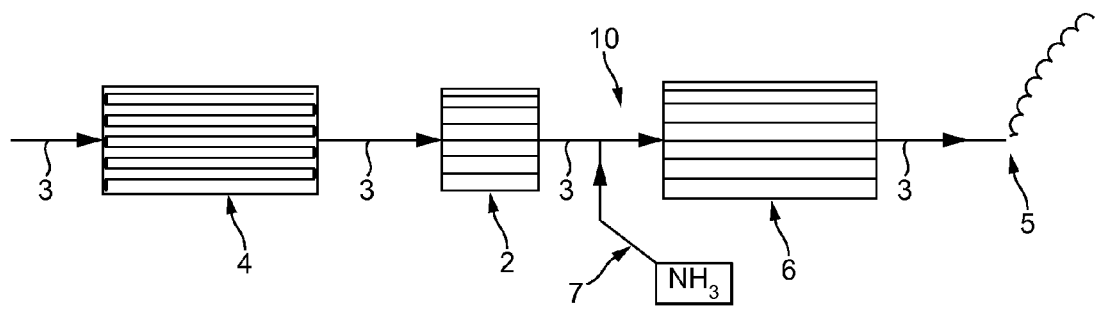
FIGS. 6A and 6B are schematic drawings of exhaust system embodiments according to the invention.

An exhaust system of the invention is shown in FIG. 6A. Exhaust system 10 comprises, in serial arrangement from upstream to downstream, a catalysed wall-flow filter 4 coated with a washcoat comprising platinum supported on an particulate alumina support material (corresponding to the "at least one second substrate monolith comprising a catalytic washcoat coating comprising at least one PGM feature of claim 1) having the purpose, among others, of promoting reactions (1) and (6) herein: a flow-through substrate monolith 2 coated with palladium supported on particulate alumina as a guard bed; a source of ammonia 7 comprising an injector for an ammonia precursor, urea; and a flow-through substrate monolith 6 coated with a Fe/Beta SCR catalyst. Each substrate monolith 2, 4, 6 is disposed in a metal container or "can" including coned diffusers and they are linked by a series of conduits 3 of smaller cross sectional area than a cross sectional area of any of substrate monoliths 2, 4, 6. The coned diffusers act to spread the flow of exhaust gas entering a housing of a "canned" substrate monolith so that the exhaust gas as a whole is directed across substantially the whole front "face" of each substrate monolith. Exhaust gas exiting substrate monolith 8 is emitted to atmosphere at "tail pipe" 5.

Figure 6B:
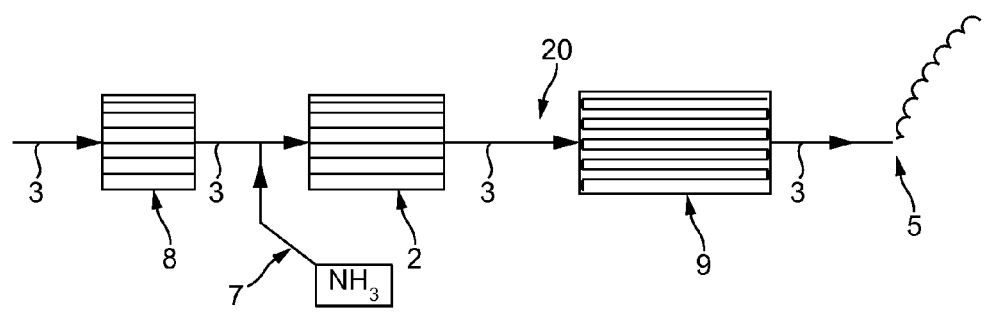

FIG. 6B shows an alternative embodiment of an exhaust system 20 according to the present invention comprising, in serial arrangement from upstream to downstream, a flow-through substrate monolith 8 coated with a two-layered diesel oxidation catalyst composition comprising both platinum and palladium at an overall Pt:Pd ratio of 4:1 for the purpose of promoting reactions (1) and (6) herein: a source of ammonia 7 comprising an injector for an ammonia precursor, urea; a flow-through substrate monolith 2 coated with a ceria-zirconia mixed oxide in a ceria:zirconia weight ratio of 9:1 as a guard bed; and a wall-flow filter substrate monolith 9 coated with a Cu/CHA SCR catalyst. Each substrate monolith 2, 8, 9 is disposed in a metal container or "can" including coned diffusers and they are linked by a series of conduits 3 of smaller cross sectional area than a cross sectional area of any of substrate monoliths 2, 8, 9. Exhaust gas exiting substrate monolith 8 is emitted to atmosphere at "tail pipe" 5. An advantage of the arrangement of the urea injector to between the second and third substrate monolith is that the third substrate monolith can act as a hydrolysis catalyst, i.e. to hydrolyse a nitrogenous reductant precursor, e.g. urea to ammonia and water, and a PGM trap, and the third substrate monolith can also assist with mixing and distribution of the nitrogenous reductant in a flowing exhaust gas upstream of the SCR catalyst.

EXAMPLES

Example 1

Preparation of Substrate Monolith Coated with 5 wt % Fe/Beta Zeolite

Commercially available Beta zeolite was added to an aqueous solution of $Fe(NO_3)_3$ with stirring. After mixing, binders and rheology modifiers were added to form a washcoat composition.

A 400 cells per square inch cordierite flow-through substrate monolith was coated with an aqueous slurry of the 5 wt % Fe/Beta zeolite sample using the method disclosed in Applicant/Assignee's WO 99/47260, i.e. comprising the steps of (a) locating a containment means on top of a support, (b) dosing a pre-determined quantity of a liquid component into said containment means, either in the order (a) then (b) or (b) then (a), and (c) by applying pressure or vacuum, drawing said liquid component into at least a portion of the support, and retaining substantially all of said quantity within the support. This coated product (coated from one end only) is dried and then calcined and this process is repeated from the other end so that substantially the entire substrate monolith is coated, with a minor overlap in the axial direction at the join between the two coatings. A core of 1 inch (2.54 cm) diameter×3 inches long was cut from the finished article.

Comparative Example 2

Preparation of Pt-Only Catalysed Wall-Flow Filter

A washcoat composition comprising a mixture of alumina particles milled to a relatively high particle size distribution, platinum nitrate, binders and rheology modifiers in deionised water was prepared. An aluminium titanate wall-flow filter was coated with the catalyst composition at a washcoat loading of 0.2 $g/in^3$ to a final total Pt loading of 5 $g/ft^{-3}$ using the method and apparatus disclosed in the Applicant/Assignee's WO 2011/080525, wherein channels at a first end intended for orientation to an upstream side were coated for 75% of their total length with a washcoat comprising platinum nitrate and particulate alumina from the intended upstream end thereof; and channels at an opposite end and intended to be oriented to a downstream side are coated for 25% of their total length with the same washcoat as the inlet channels. That is, the method comprised the steps of: (i) holding a honeycomb monolith substrate substantially vertically; (ii) introducing a pre-determined volume of the liquid into the substrate via open ends of the channels at a lower end of the substrate; (iii) sealingly retaining the introduced liquid within the substrate; (iv) inverting the substrate containing the retained liquid; and (v) applying a vacuum to open ends of the channels of the substrate at the inverted, lower end of the substrate to draw the liquid along the channels of the substrate. The catalyst composition was coated on filter channels from a first end, following which the coated filter was dried. The dried filter coated from the first end was then turned and the method was repeated to coat the same catalyst to filter channels from the second end, followed by drying and calcining.

A core of 1 inch (2.54 cm) diameter×3 inches (7.62 cm) long was cut from the finished article. The resulting part is described as "fresh", i.e. unaged.

Examples 3A and 3B

Preparation of Alumina Guard Beds

A 400 cells per square inch cordierite flow-through substrate monolith was coated with an aqueous slurry comprising particulate alumina using the method disclosed in Applicant/Assignee's WO 99/47260. The solids content was selected to prepare two different washcoat loadings: a first (designated Example 3A) of 1.0 $g/in^3$; and a second (3B) of 0.4 $g/in^3$. The resulting parts were dried, then calcined.

A core of 1 inch (2.54 cm) diameter×3 inches (7.62 cm) long was cut from the finished article.

Examples 4A and 4B

Preparation of Ceria:Zirconia Mixed Oxide Guard Beds

A 400 cells per square inch cordierite flow-through substrate monolith was coated with an aqueous slurry comprising a particulate ceria:zirconia mixed oxide using the method disclosed in Applicant/Assignee's WO 99/47260. Two different ceria:zirconia mixed oxide materials were used. A first (designated Example 4A) had a ceria:zirconia weight ratio of 9:1; whereas a second (4B) had ceria:zirconia weight ratio of 1:9. Both ceria:zirconia mixed oxides were coated on the flow-through substrate monolith at a washcoat loading of 1.0 $g/in^3$. The resulting parts were dried, then calcined.

A core of 1 inch (2.54 cm) diameter×3 inches (7.62 cm) long was cut from the finished article.

Examples 5A and 5B

Preparation of Pd/Ceria:Zirconia Mixed Oxide Guard Beds

Samples prepared according to Examples 4A and 4B prior to core cutting were impregnated with an aqueous solution of palladium nitrate (designated as Examples 5A and 5B respectively). The resulting parts were then dried and calcined and a core of 1 inch (2.54 cm) diameter×3 inches (7.62 cm) long was cut from each finished article.

The process was conducted in such a way as to obtain a palladium loading in the final product of 5.0 g/ft³.

Example 6

Preparation of Pd/Alumina Guard Bed

Sample 3A prior to core cutting was impregnated with an aqueous solution of palladium nitrate. The resulting part was then dried and calcined and a core of 1 inch (2.54 cm) diameter×3 inches (7.62 cm) long was cut from each finished article.

The process was conducted in such a way as to obtain a palladium loading in the final product of 5.0 g/ft³.

Example 7

Preparation of 1:1 Weight % Pt:Pd Containing Catalysed Wall-Flow Filter

A coated filter was prepared using the same method as in Comparative Example 2, except in that the washcoat applied to both the inlet channels and the outlet channels of the filter included palladium nitrate in addition to the platinum nitrate. The washcoat loading in the inlet and outlet channels was conducted in such a way as to arrive at a 5 g/ft³ Pt, 5 g/ft³ Pd loading on both the inlet surfaces and the outlet surfaces, i.e. a total PGM loading of 10 g/ft³.

A core of 1 inch (2.54 cm) diameter×3 inches long was cut from the finished article. The resulting part is described as "fresh", i.e. unaged.

Example 8

Preparation of 5:1 Weight % Pt:Pd Containing Catalysed Wall-Flow Filter

A coated filter was prepared using the same method as in Comparative Example 2, except in that the washcoat applied to both the inlet channels and the outlet channels of the filter included palladium nitrate in addition to the platinum nitrate. The washcoat loading in the inlet and outlet channels was conducted in such a way as to arrive at a 5 g/ft³ Pt, 1 g/ft³ Pd loading on both the inlet surfaces and the outlet surfaces, i.e. a total PGM loading of 6 g/ft³.

A core of 1 inch (2.54 cm) diameter×3 inches long was cut from the finished article. The resulting part is described as "fresh", i.e. unaged.

Example 9

System Tests

The tests were performed on a first synthetic catalyst activity test (SCAT) laboratory reactor illustrated in FIG. 1, in which a fresh core of the coated Fe/Beta zeolite SCR catalyst of Example 1 is disposed in a conduit downstream of a core of either the catalysed wall-flow filter of Comparative Example 2 (control) or of fresh cores of Comparative Example 2 followed in turn by Guard Bed cores of Examples 3A, 3B, 4A, 4B, 5A, 5B or 6. A synthetic gas mixture was passed through the conduit at a catalyst swept volume of 30,000 hr⁻¹. A furnace was used to heat (or "age") the catalysed wall-flow filter sample at a steady-state temperature at a filter inlet temperature of 900° C. for 60 minutes, during which the inlet SCR catalyst temperature was held at 300° C. The Guard Bed cores were located in the furnace immediately downstream of the Comparative Example 2 core and heated to 900° C. (see also FIG. 1). An air (heat exchanger) or water cooling mechanism was used to effect the temperature drop between the filter and the SCR catalyst. The gas mixture during the ageing was 10% $O_2$, 6% $H_2O$, 6% $CO_2$, 100 ppm CO, 400 ppm NO, 100 ppm HC as Cl, balance $N_2$.

Following ageing, the aged SCR catalysts were removed from the first SCAT reactor and inserted into a second SCAT reactor specifically to test $NH_3$—SCR activity of the aged samples. The aged SCR catalysts were then tested for SCR activity at 150, 200, 250, 300, 350, 450, 550 and 650° C. using a synthetic gas mixture ($O_2$=14%: $H_2O$=7%; $CO_2$=5%; $NH_3$=250 ppm; NO=250 ppm; $NO_2$=0 ppm; $N_2$=balance) and the resulting $NO_x$ conversion was plotted against temperature for each temperature data point in FIGS. 2 and 3. These plots essentially measure competition between reaction (9) and reaction (5) and thus how much reaction (9) affects the $NO_x$ conversion by consumption of the available $NH_3$ needed for the SCR reaction (reaction (5)).

Figure 2:
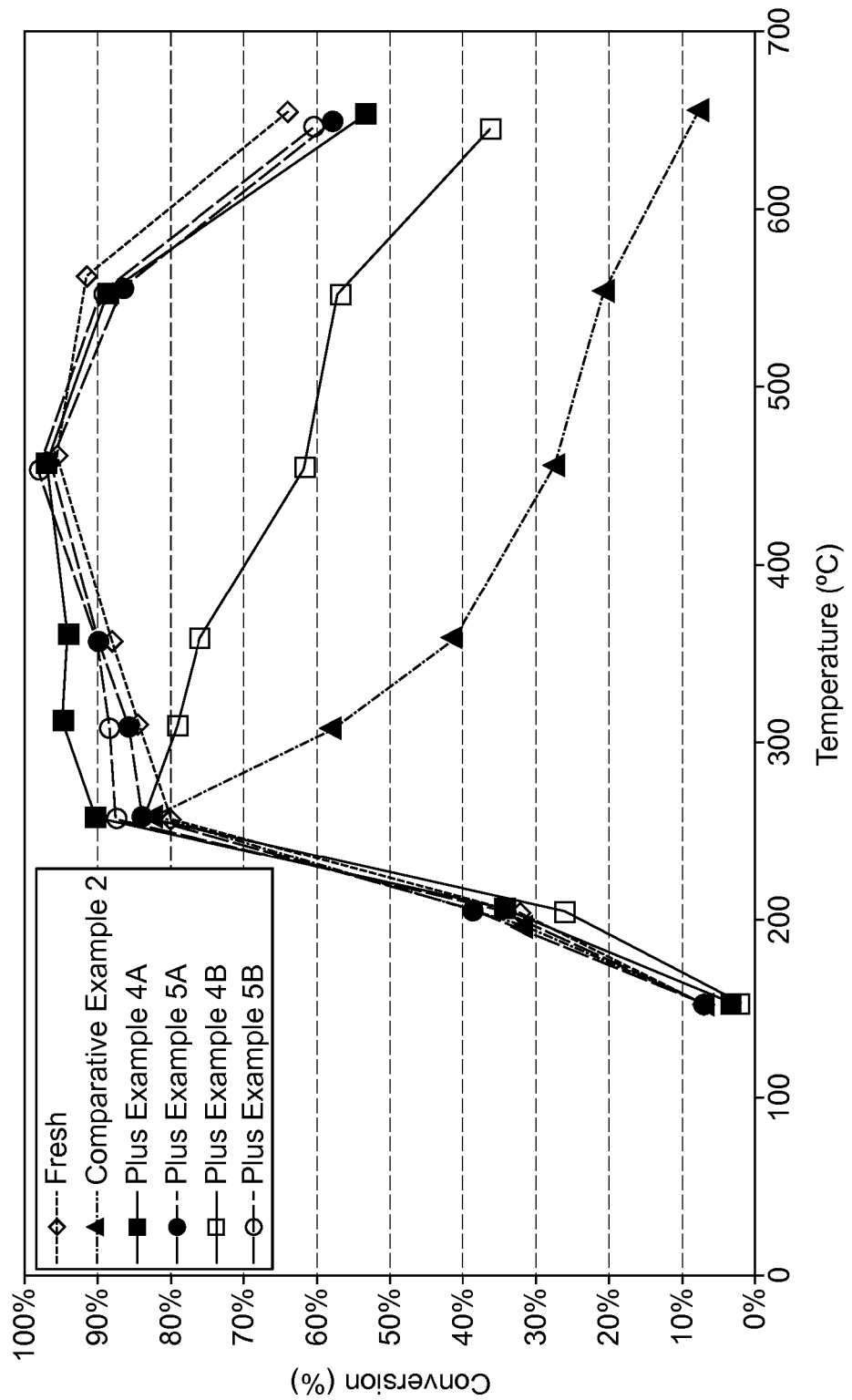
FIG. 2 is a graph comparing the $NO_x$ conversion activity as a function of temperature of five aged SCR catalyst cores each of which has been aged in a laboratory-scale exhaust system configuration containing a core of Comparative Example 2 downstream of which was a Guard Bed core from each of Examples 4A, 4B, 5A and 5B. The results of the aged SCR activity are plotted against activity of a fresh, i.e. un-aged Fe/Beta SCR catalyst and a control of Comparative Example 2 (no Guard Bed).
Figure 3:
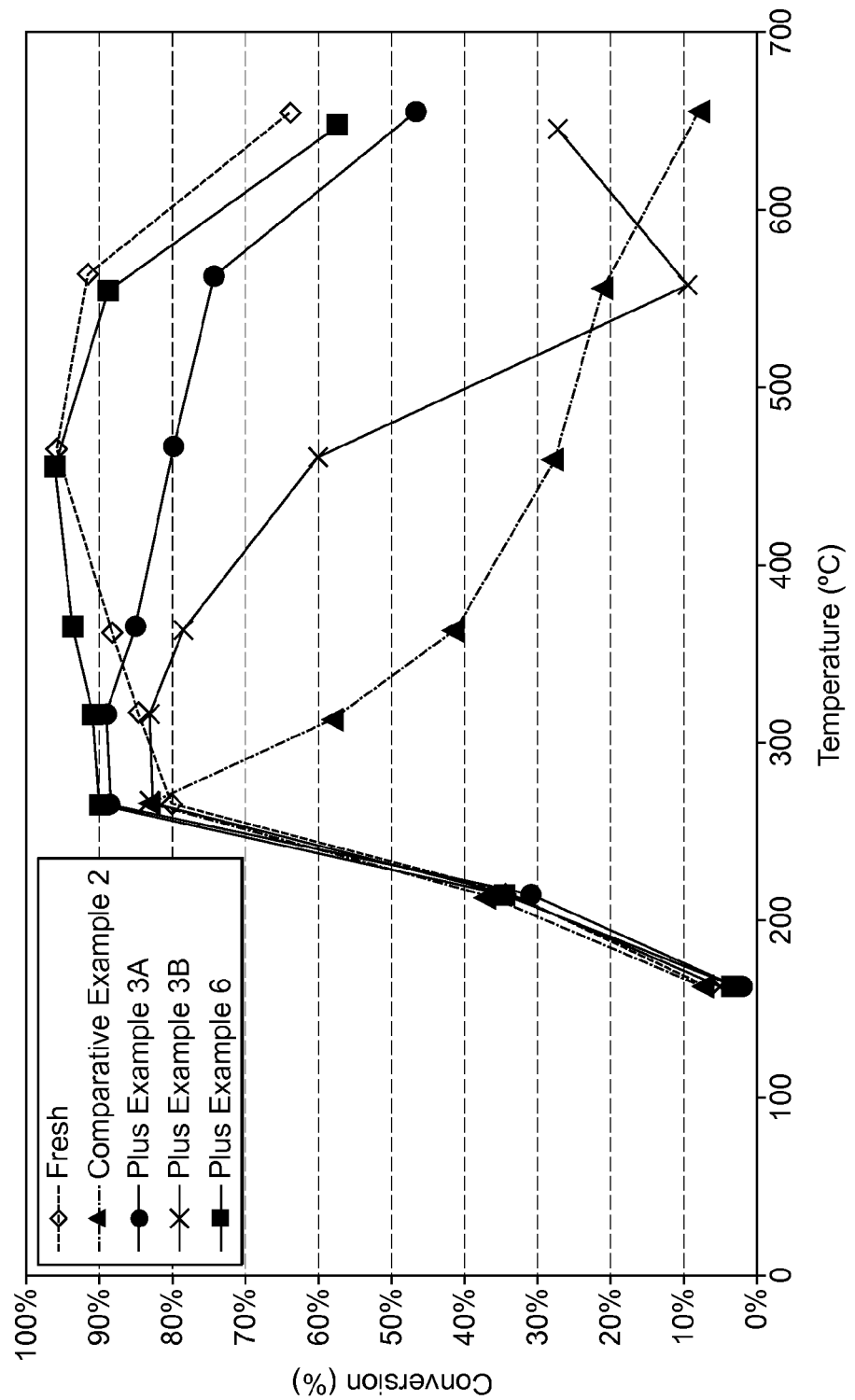
FIG. 3 is a graph comparing the $NO_x$ conversion activity as a function of temperature of a further three aged SCR catalyst cores each of which has been aged in a laboratory-scale exhaust system configuration containing a core of Comparative Example 2 downstream of which was a Guard Bed core from each of Examples 3A, 3B and 6. The results of the aged SCR activity are plotted against activity of a fresh, i.e. un-aged Fe/Beta SCR catalyst and a control of Comparative Example 2 (no Guard Bed).

The results are shown in FIGS. 2 and 3. It can be seen from the results in FIG. 2 that the SCR catalyst behind the guard bed comprising the 9:1 ceria:zirconia mixed oxide of Example 4A retained substantially all SCR activity, whereas the SCR catalyst aged downstream of the guard bed comprising 1:9 ceria:zirconia mixed oxide of Example 4B retained less $NO_x$ conversion activity. The results of the control experiment featuring Comparative Example 2 only (no guard bed) show that in the absence of a guard bed, the $NO_x$ conversion activity of the SCR catalyst is substantially reduced. The inventors concluded that this result is explained by platinum from the catalysed soot filter of Comparative Example 2 volatilising and migrating to the downstream SCR catalyst. The migrated platinum reduces net $NO_x$ conversion by causing the undesirable combustion of ammonia according to reaction (9). Hence, Example 4B is a poorer guard bed than Example 4A, as the SCR catalyst "guarded" by the guard bed of Example 4B retains less $NO_x$ conversion activity. Furthermore, the inventors concluded that, following the trend of the results for Examples 4B and 4A, 100% cerium oxide, i.e. ceria, would also perform similarly to the Example 4A sample. However, the choice of whether to use ceria as such may be influenced by other factors, such as the desired thermal durability and/or tolerance to sulphur poisoning. Substantially no loss in activity was seen between a fresh Fe/Beta SCR catalyst and a Fe/Beta SCR catalyst aged at 300° C. for 1 hour without any catalyst present upstream (results not shown).

Example 5B shows that the ability of Example 4B to protect the SCR catalyst from being contacted by volatilised platinum is improved with the addition of Pd. However, since the ability of Example 4A (no palladium) to guard the SCR catalyst from volatilised platinum is already significant, no additional improvement is seen when palladium is added to the 9:1 ceria-zirconia of Example 4A. In summary, therefore, Example 4A shows that it is possible to guard a downstream SCR catalyst from potential contact by volatilised platinum without recourse to expensive additional components such as palladium.

Referring to FIG. 3, it can be seen from these results that alumina only has some ability to protect a downstream SCR catalyst from contact with volatilised platinum (Example 3B) and that such ability can be improved by increasing the alumina washcoat loading and most preferably by supporting palladium on the alumina. However, on a cost/benefit analysis, the best result obtained in the Examples is to use the 9:1 weight ratio of ceria-zirconia mixed oxide of Example 4A.

Example 10

Preparation of Substrate Monolith Coated with 3 wt % Cu/CHA Zeolite

Commercially available aluminosilicate CHA zeolite was added to an aqueous solution of $Cu(NO_3)_2$ with stirring. The slurry was filtered, then washed and dried. The procedure can be repeated to achieve a desired metal loading. The final product was calcined. After mixing, binders and rheology modifiers were added to form a washcoat composition.

A 400 cpsi cordierite flow-through substrate monolith was coated with an aqueous slurry of the 3 wt % Cu/CHA zeolite sample using the method disclosed in Applicant/Assignee's WO 99/47260 described in Example 1 hereinabove. The coated substrate monolith was aged in a furnace in air at 500° C. for 5 hours. A core of 1 inch (2.54 cm) diameter×3 inches long (7.62 cm) was cut from the finished article.

Example 11

Further Pt:Pd Weight Ratio Studies

Two diesel oxidation catalysts were prepared as follows:
Diesel Oxidation Catalyst A
A single layered DOC was prepared as follows. Platinum nitrate and palladium nitrate were added to a slurry of silica-alumina. Beta zeolite was added to the slurry such that it comprised <30% of the solids content as zeolite by mass. The washcoat slurry was dosed onto a 400 cpsi flow-through substrate using the method of Example 10. The dosed part was dried and then calcined at 500° C. The total platinum group metal loading in the washcoat coating was 60 gft$^{-3}$ and the total Pt:Pd weight ratio was 4:1. A core of 1 inch (2.54 cm) diameter×3 inches (7.62 cm) long was cut from the finished article. The resulting part may be described as "fresh", i.e. unaged.
Diesel Oxidation Catalyst B
A single layered DOC was prepared as follows. Platinum nitrate and palladium nitrate were added to a slurry of silica-alumina. Beta zeolite was added to the slurry such that it comprised <30% of the solids content as zeolite by mass. The washcoat slurry was dosed onto a 400 cpsi flow-through substrate using the same method as used for DOC A. The dosed part was dried and then calcined at 500° C. The total PGM loading in the single layer DOC was 120 g/ft$^3$ and the Pt:Pd weight ratio was 2:1. A core of 1 inch (2.54 cm) diameter×3 inches (7.62 cm) long was cut from the finished article. The resulting part may be described as "fresh", i.e. unaged.

Figure 5:
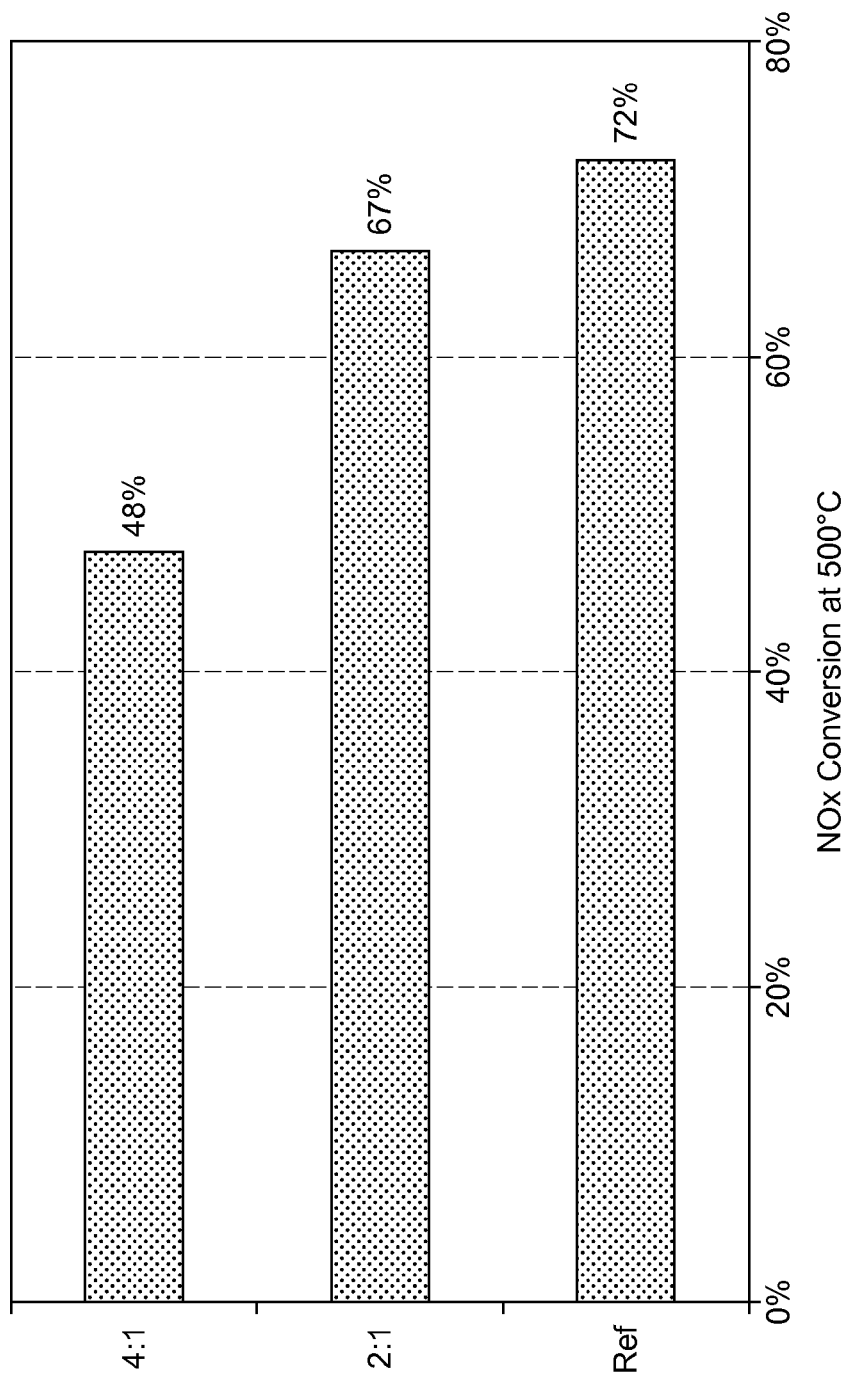
FIG. 5 is a bar chart comparing the $NO_x$ conversion activity as a function of temperature of two aged Cu/CHA SCR catalyst cores each of which has been aged in the laboratory-scale exhaust system shown in FIG. 1 containing core samples of the diesel oxidation catalyst of Comparative Example 8 heated in a tube furnace at 900° C. for 2 hours in a flowing synthetic exhaust gas with the Cu/CHA zeolite SCR catalyst core held at 300° C. located downstream.

Both catalysts were tested according the protocols set out in Example 12. The results are set out in FIG. 5 with reference to a control (aged SCR catalyst that has not been further aged downstream of either DOC A or DOC B).

Example 12

System Tests

The tests were performed on a first synthetic catalyst activity test (SCAT) laboratory reactor illustrated in FIG. 1, in which an aged core of the coated Cu/CHA zeolite SCR catalyst of Example 1 was disposed in a conduit downstream of a core of either the Diesel Oxidation Catalyst (DOC) A or B (according to Example 11). A synthetic gas mixture was passed through the conduit at a rate of 6 liters per minute. A furnace was used to heat (or "age") the DOC samples at a steady-state temperature at a catalyst outlet temperature of 900° C. for 2 hours. The SCR catalyst was disposed downstream of the DOC sample and was held at a catalyst temperature of 300° C. during the ageing process by adjusting the length of tube between the furnace outlet and the SCR inlet, although a water cooled heat exchanger jacket could also be used as appropriate. Temperatures were determined using appropriately positioned thermocouples ($T_1$ and $T_2$). The gas mixture used during the ageing was 40% air, 50% $N_2$, 10% $H_2O$.

Figure 4:
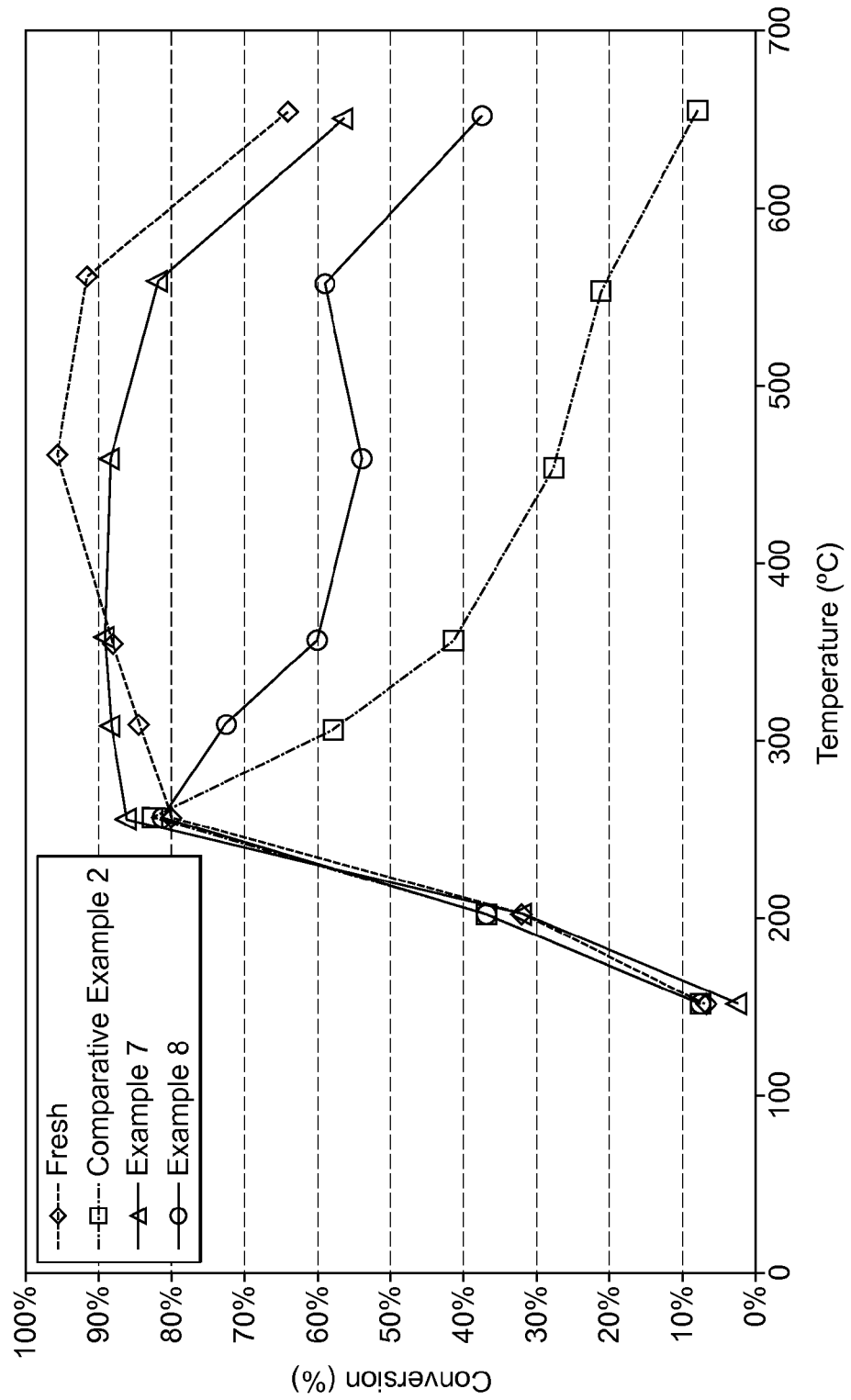
FIG. 4 is a graph plotting the results of $NO_x$ conversion activity as a function of temperature for a fresh Fe/Beta zeolite SCR catalyst compared with the activity of Fe/Beta zeolite SCR catalysts aged in the laboratory scale exhaust system shown in FIG. 1 containing catalysed soot filter cores of Comparative Example 2 and Examples 7 and 8.

Following the DOC ageing, the SCR catalysts were removed from the first SCAT reactor and inserted into a second SCAT reactor specifically to test $NH_3$—SCR activity of the aged samples. The SCR catalysts were then tested for SCR activity at 500° C. using a synthetic gas mixture ($O_2$=10%; $H_2O$=5%; $CO_2$=7.5%; CO=330 ppm; $NH_3$=400 ppm; NO=500 ppm; $NO_2$=0 ppm; $N_2$=balance, i.e. an alpha value of 0.8 was used (ratio of $NH_3$:$NO_x$), so that the maximum possible $NO_x$ conversion available was 80%) and the resulting $NO_x$ conversion was plotted against temperature on the accompanying bar chart in FIG. 5. This plot essentially measures competition between reaction (9) and reaction (5) and thus how much reaction (9) affects the $NO_x$ conversion by consumption of the available $NH_3$ needed for the SCR reaction (reaction (5)).
Pt:Pd Weight Ratio Study—Conclusions Taken as a whole, the results of Example 9 shown in FIG. 4 in connection with Examples 7 and 8 and Comparative Example 2 indicate that a Pt:Pd weight ratio of between 1:1 and 5:1 is beneficial in reducing the problem of $NO_x$ conversion activity loss through volatilisation of platinum group metal, principally platinum, from a platinum group metal containing catalyst to a downstream SCR catalyst; and The results of Example 12 shown in FIG. 5 in connection with Diesel Oxidation Catalysts A and B show that for a SCR catalyst aged downstream of a DOC having a 2:1 Pt:Pd weight ratio overall, the loss of $NO_x$ conversion activity is relatively slight at 67% $NO_x$ conversion activity compared with the control at 72% $NO_x$ conversion activity (a SCR catalyst aged behind a 1:1 Pt:Pd weight ratio overall DOC (not described herein) using the same protocol had a $NO_x$ conversion activity of 69%). However, when the overall Pt:Pd weight ratio was increased to 4:1, SCR activity was significantly reduced to 48%.

The inventors conclude, therefore, that there exists a boundary at about 2:1 Pt:Pd weight ratio overall above which Pt volatilisation is more likely to occur. Hence, by limiting to an overall Pt:Pd weight ratio of 2:1 in the DOC as a whole, and to ≤2:1 Pt:Pd weight ratio in the second washcoat coating layer, Pt in the DOC is less likely to volatilise and migrate to a downstream SCR catalyst.

For the avoidance of any doubt, the entire contents of any and all documents cited herein are incorporated herein by reference in their entirety.

The invention claimed is:
1. A method of reducing or preventing a selective catalytic reduction (SCR) catalyst disposed on a first substrate monolith in an exhaust system of a lean-burn internal combustion engine from becoming poisoned with platinum group metal (PGM) which may volatilise from a catalyst composition comprising PGM disposed on at least one second substrate monolith upstream of the SCR catalyst when the catalyst composition comprising PGM is exposed to relatively extreme conditions including relatively high temperatures, which method comprising adsorbing volatilised PGM in at least one PGM trapping material, where the at least one PGM trapping material is disposed on a third substrate monolith, and wherein the third substrate monolith is disposed between the first substrate monolith and the or each second substrate monolith, and wherein:
(i) the first substrate monolith is a filtering substrate monolith having inlet surfaces and outlet surfaces, wherein the inlet surfaces are separated from the outlet surfaces by a porous structure; or
(ii) the second substrate monolith or each second substrate monolith is a filtering substrate monolith having inlet surfaces and outlet surfaces, wherein the inlet surfaces are separated from the outlet surfaces by a porous structure.

2. The method according to claim 1, wherein the at least one material for trapping volatilised PGM comprises a metal oxide selected from the group consisting of optionally stabilised alumina, optionally stabilised zirconia, an optionally stabilised ceria-zirconia mixed oxide, and a mixture of any two or more thereof.

3. The method according to claim 2, wherein the at least one material for trapping volatilised PGM is a component of a washcoat coating applied to the third substrate monolith.

4. The method according to claim 1, wherein at least one second substrate monolith comprises platinum.

5. The method according to claim 1, wherein the at least one material for trapping volatilised PGM comprises a catalyst composition comprising at least one metal selected from the group consisting of palladium, copper, silver, gold and a combination of any two or more thereof, supported on at least one support material.

6. The method according to claim 5, wherein the third substrate monolith comprises a washcoat coating comprising both platinum and palladium at a lower Pt:Pd weight ratio than the or each catalyst composition of the or each second substrate monolith.

7. The method according to claim 6, wherein a weight ratio of Pt:Pd in the washcoat coating of the third substrate is ≤2.

8. The method according to claim 1, wherein the exhaust system comprises means for injecting a nitrogenous reductant or a precursor thereof into a flowing exhaust gas between the first substrate monolith and the second substrate monolith.

9. The method according to claim 1, wherein the second substrate monolith or each second substrate monolith is individually selected from an oxidation catalyst and a $NO_x$ Absorber Catalyst (NAC).

10. The method according to claim 1, wherein the filtering substrate monolith is a wall-flow filter.

11. A method of reducing or preventing a selective catalytic reduction (SCR) catalyst disposed on a first substrate monolith in an exhaust system of a lean-burn internal combustion engine from becoming poisoned with platinum group metal (PGM) which may volatilise from a catalyst composition comprising PGM disposed on at least one second substrate monolith upstream of the SCR catalyst when the catalyst composition comprising PGM is exposed to relatively extreme conditions including relatively high temperatures, which method comprising adsorbing volatilised PGM in at least one PGM trapping material, wherein:
the at least one PGM trapping material is disposed on a third substrate monolith and comprises a catalyst composition comprising at least one metal supported on at least one support material, wherein the at least one metal is selected from the group consisting of palladium, copper, silver, gold and a combination of any two or more thereof;
the third substrate monolith comprises a washcoat coating comprising both platinum and palladium at a lower Pt:Pd weight ratio than the or each catalyst composition of the or each second substrate monolith; and
the third substrate monolith is disposed between the first substrate monolith and the or each second substrate monolith.

12. The method according to claim 11, wherein the at least one material for trapping volatilised PGM comprises a metal oxide selected from the group consisting of optionally stabilised alumina, optionally stabilised zirconia, an optionally stabilised ceria-zirconia mixed oxide and a mixture of any two or more thereof.

13. The method according to claim 11, wherein at least one second substrate monolith comprises platinum.

14. The method according to claim 11, wherein a weight ratio of Pt:Pd in the washcoat coating of the third substrate is ≤2.

15. The method according to claim 11, wherein the exhaust system comprises means for injecting a nitrogenous reductant or a precursor thereof into a flowing exhaust gas between the first substrate monolith and the second substrate monolith.

16. The method according to claim 11, wherein the second substrate monolith or each second substrate monolith is individually selected from an oxidation catalyst and a $NO_x$ Absorber Catalyst (NAC).

17. A method of reducing or preventing a selective catalytic reduction (SCR) catalyst disposed on a first substrate monolith in an exhaust system of a lean-burn internal combustion engine from becoming poisoned with platinum group metal (PGM) which may volatilise from a catalyst composition comprising PGM disposed on at least one second substrate monolith upstream of the SCR catalyst when the catalyst composition comprising PGM is exposed to relatively extreme conditions including relatively high temperatures, which method comprising adsorbing volatilised PGM in at least one PGM trapping material, which is disposed on a third substrate monolith, and wherein the third substrate monolith disposed between the first substrate monolith and the or each second substrate monolith, and wherein at least one second substrate monolith comprises a catalytic washcoat coating comprising at least one platinum group metal (PGM), wherein the at least one platinum group metal (PGM) comprises both platinum and palladium and a weight ratio of Pt:Pd is ≤2.

18. The method according to claim 17, wherein the at least one material for trapping volatilised PGM comprises a metal oxide selected from the group consisting of optionally stabilised alumina, optionally stabilised zirconia, an optionally stabilised ceria-zirconia mixed oxide, and a mixture of any two or more thereof.

19. The method according to claim 17, wherein the at least one material for trapping volatilised PGM comprises a catalyst composition comprising at least one metal selected from the group consisting of palladium, copper, silver, gold and a combination of any two or more thereof, supported on at least one support material.

20. The method according to claim 17, wherein the exhaust system comprises means for injecting a nitrogenous reductant or a precursor thereof into a flowing exhaust gas between the first substrate monolith and the second substrate monolith.

* * * * *